United States Patent [19]

Prudhomme et al.

[11] Patent Number: 4,848,317

[45] Date of Patent: Jul. 18, 1989

[54] DEEP FAT GAS FRYER APPARATUS

[75] Inventors: Malcolm Prudhomme; Steven M. Prudhomme, both of Port Barre, La.

[73] Assignee: C.P. Partnership, Inc., Jefferson, La.

[21] Appl. No.: 241,860

[22] Filed: Sep. 1, 1988

Related U.S. Application Data

[63] Continuation of Ser. No. 53,696, May 26, 1987, abandoned.

[51] Int. Cl.⁴ .............................................. A47J 27/00
[52] U.S. Cl. .................................... 126/391; 126/390; 99/403
[58] Field of Search .................. 126/360 R, 369, 378, 126/390, 391; 99/330, 336, 403, 407, 408

[56] References Cited

U.S. PATENT DOCUMENTS

| | | | |
|---|---|---|---|
| 1,630,309 | 5/1927 | Pitman | 126/391 |
| 2,176,869 | 10/1939 | Childs | 126/391 |
| 2,429,360 | 10/1947 | Kells | 126/391 |
| 2,655,144 | 10/1953 | Keating | 126/391 |
| 3,217,704 | 11/1965 | Anetsberger | 126/391 |

Primary Examiner—James C. Yeung
Assistant Examiner—Noah Kamen
Attorney, Agent, or Firm—Pravel, Gambrell, Hewitt, Kimball & Krieger

[57] ABSTRACT

A deep fat frying system comprising an open ended frying chamber having a plurality of side walls, a floor portion for defining the basic frying chamber. There is further incorporated a heating system which would comprise an intake fan for intaking air, a gas inlet line, and an ignition zone for igniting the gas as the air is blown through the heating system. The heating system would further include a pair of flow channels which would be in spaced apart relation and directed in a modified "S" fashion through the frying chambers so that there are a plurality of right angle turns within the heating chambers prior to the heated air reaching the exit point at the rear end of the chamber. The angulated configuration of the double hot air flow channels would achieve a greater time within the hot oil that the heat is radiated outwardly into the oil and therefore less heat would escape and be lost to the back through the exiting point of the flow channels.

6 Claims, 3 Drawing Sheets

DEEP FAT GAS FRYER APPARATUS

This is a continuation of application Ser. No. 053,696, filed 05/26/87, presently pending by the same inventor, now abandoned.

BACKGROUND OF THE INVENTION

1. Field of the Invention

The apparatus of the present invention relates to frying foods. More particularly, the present invention relates to a deep fat gas fryer apparatus incorporating a heating system which comprises a double channeled hot-air system providing increased surface area between the heating system and the oil for increasing the efficiency of the system.

2. General Background

In the present state of the art, in systems for deep frying foods, such as fish or chicken, one of the systems which has become popularized is the use of a gas burner wherein air is fed into a plurality of parallel channels within the oil to heat the oil to the desired temperature, with the air being blown out through the back of the frying system. The combustion chamber walls absorb heat from the combusting gas by means of radiation, and convection. There has been a great attempt to construct heat absorbing surfaces in such a manner as to make the most of the heat released by the fuel when it chemically combines with the oxygen in the air supply. In some cases, the best means of transferring heat may be convection and in other cases, it may be by radiant means. In the case of small heaters such as deep fryers, the size of the equipment is relatively small so that radiate heat transfer predominates.

Several shortcomings are noted with this type of deep frying system. The system has a low efficiency due to the fact that the heat blown from the front to the rear of the fryer, does not remain in contact with the oil in a sufficient amount of time, and therefore at the very low efficiency in the system. In addition, there is a continuing problem with heat exiting the rear of the fryer again due to the fact that the path of the combustibles through the system is very short and entire heat transfer is therefore not achieved. U.S. Pat. No. 3,990,433 to Keating disclose this type of state of the art frying system.

Therefore, there appears to be a need for a heating system in the gas fryer to obtain a greater efficiency in heat transfer, and to release less heat from exhaust.

With less heat being exhausting into the building, a smaller exhausting system could be installed which would result in less air conditioning being lost through the exhaust system.

SUMMARY OF THE INVENTION

The apparatus of the present invention solves the shortcomings in the art in a simply and straightforward manner. What is provided is a deep fat frying system comprising an open ended frying chamber having a plurality of side walls and a floor portion for defining the basic frying chamber. There is further incorporated a heating system which would comprise an intake fan for intaking air, a gas inlet line, and an ignition zone for igniting the gas as the air is blown through the heating system. The heating system would further include a pair of flow channels which would be in spaced apart parallel relation and directed in a modified "S" fashion through the frying chambers so that there are a plurality of angle turns within the heating chambers prior to the heated air reaching the exit point at the rear end of the chamber. The angulated configuration of the double hot air flow channels would achieve a greater time within the hot oil that the heat is radiated outwardly into the oil and therefore less heat would escape and be lost to the back through the exiting point of the flow channels.

In addition, the configuration of the flow channels would be such that no food or the like would accumulate on the upper portion of the channel where burning could take place and lead to a faster breakdown of the heating oil.

Therefore, it is a principal object of the present invention to provide a more efficient heating system within a gas deep fat frying system;

It is still a further object of the present invention to provide a heating system within a gas deep fat fryer which would be so configured so that the hot air blown through the heating system is maintained within the system and more heat is transferred into the oil during the heating time;

It is still a further object of the present invention to provide deep fat frying system providing a double channel modified "S" pattern of the flow channels within the oil for providing a greater surface area for radiating heat out into the oil and therefore being more efficient.

ADVANTAGES OF THE SYSTEM OF THE PRESENT INVENTION

In a report prepared for the inventor entitled "Thermal Efficiency Comparison Of A Prudhomme Prototype Gas Fired Food Fryer To A Commercially-Available Heating Fryer: Phase II", dated Mar. 2, 1987, the report compared thermal efficiency of the present invention to a commercially-available heating model BBFM 20 unit. In addition, air pollution and transient response test were conducted on both units. As in previous tests, the energy load was simulated by boiling water.

The heating unit supplied was a natural draft Keating model A-20A rated for 135,000 BTU's - Hr. at 3.5 IWC gas manifold pressure. The keating heat exchange is consisted of four parallel tubes, each 20 inches in length and fired by separate ventori-type of gas burner. The total heat transfer surface area of these tubes was about 6.9 square feet. A Prudhomme unit and the modified "S" configuration has a total of 10.12 square feet.

Synopsis of the test data and results are presented in Table 1. All temperatures and concentrations are averages of multiple readings. Calculations are based on the following assumptions:

1. Fuel Gas: Assumed to be pure methane ($CH_4$), with a higher heating value of 1008 BTU-STD CUFT. Corrected to 77 F and 14.696 Psi 8.

2. Thermal Efficiency: Energy load based on evaporation of 212 F. water at 970.4 BTU-LB. Efficiency based on higher heating valve of fuel in accordance with normal U.S. practice.

As was determined in previous tests, the Prudhomme unit is considerably more efficient than the Keating unit. Whereas the Keating thermal efficiency was 43% for the one run conducted, Prudhomme efficiency varied from 69% to 76% depending on the firing ring. It should be noted, however, that the energy balance was not especially good on tests PS-1 and PS-2 so it is possible that the efficiency of these tests would actually be somewhat lower than reported and thus somewhat more strongly depended upon firing rate than indicated in Table 1. The reason for this discrepancy is not clear but, since there was a generally good correlation between the measured evaporation ranges of water level measurement, it is suspected that there may be some problem with the Rockwell flow meter at lower rates. In any event, the energy balance is for the higher fuel range (test PS-3 and KS), were very good and substantiate the 1986 tests in all important respects.

The complete titled report is hereby incorporated in its entirety by reference thereto.

DETAILED DESCRIPTION OF THE PREFERRED EMBODIMENT

Figure 1:
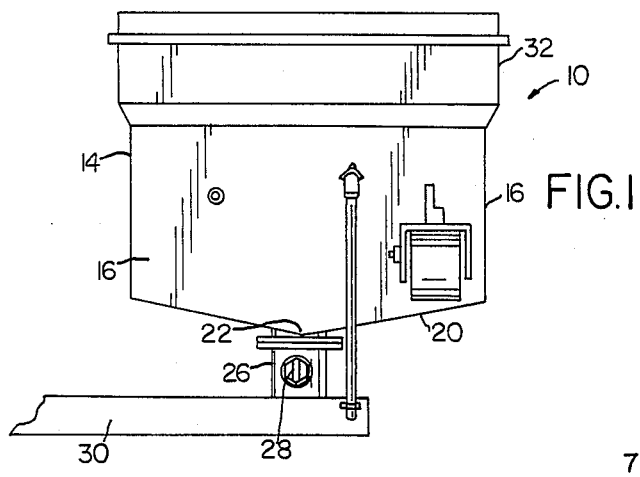
FIG. 1 is an end view of the heat intake in the preferred embodiment of the apparatus of the present invention.
Figure 2:
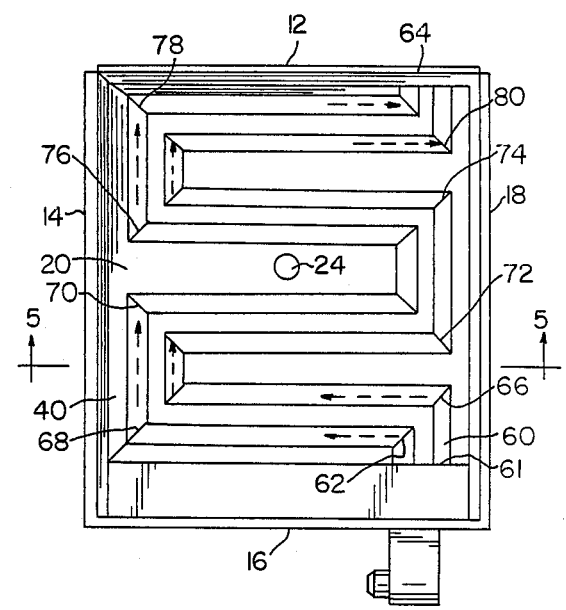
FIG. 2 is a top view of the preferred embodiment of the apparatus of the present invention.
Figure 3:
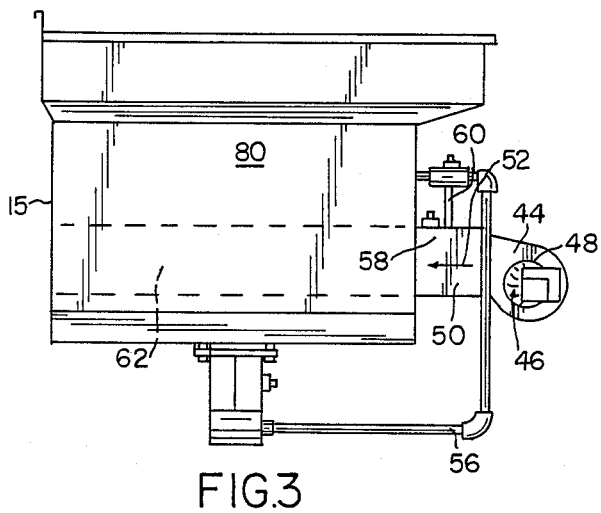
FIG. 3 is a side view of the preferred embodiment of the apparatus of the present invention.
Figure 4:
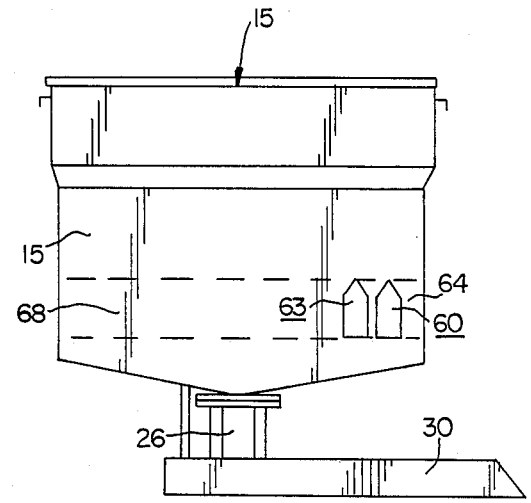
FIG. 4 is an end view of the heat outlet side of the preferred embodiment of the apparatus of the present invention.

FIGS. 1-6 illustrate the preferred embodiment of the apparatus of the present invention by the numeral 10. As seen in the FIGS., deep fat frying apparatus 10 would comprise a open ended frying chamber having a plurality of side walls 12, 14, 16 and 18; a floor portion 20; the side walls and floor portion 20 defining the basic frying chamber therewithin for deep frying food stuffs such as seafood, poultry or other meats. As seen in the FIGS., the typical fryer apparatus 10 would have the bottom portion 20 angulated along its length to a central lower most portion 22 so that any grease or the like contained within the apparatus may be drained therefrom via port 24 as seen in FIG. 2. For purposes of drainage, there is illustrated a catch basin 26 located directly beneath port 24 as seen in FIG. 1, which catch basin 26 having a valve 28 for closing and opening the catch basin 26 depending on the task being undertaking, and a grease drainage line 30 which, in the system, would lead to a filtration system or the like so that the grease may be drained therefrom. As seen in the FIGURE also the side portions 14 through 18 would have an upper expanded stop entry portion 32 which would allow the placement of basket or the like, (not illustrated in the typical frying unit as the item is being fried therein).

Figure 5:
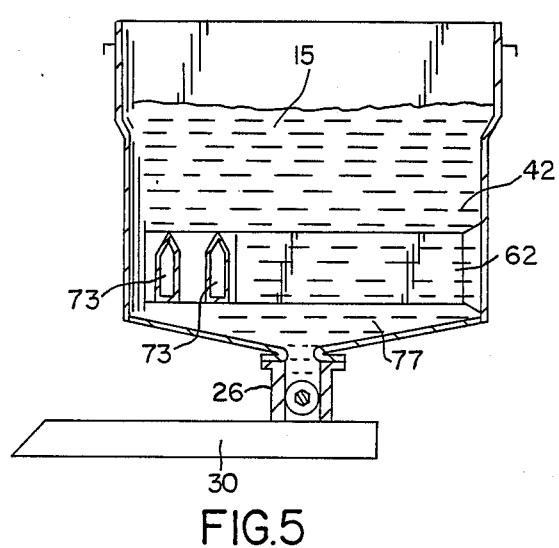
FIG. 5 is a cross sectional view along lines 5—5 in FIG. 2 in the preferred embodiment of the apparatus of the present invention.

Turning now to FIGS. 2-6, there is illustrated the heating means 40 which would serve to heat the quantity of grease 42 as seen in FIG. 5. In the cooking chamber 15 as will be described further, heating means 40 would comprise initially an air intake fan 44, which is positioned exterior to the cooking chamber 15 preferably on its rear wall, and which is a typical fan having a rotatable blade member 46, for intaking air externally of the chamber 15 via port 48 into fan 46 for directing the air in a chute 50 in the direction of Arrow 52 towards the internal heating chamber of the apparatus. Simultaneously, there is included a gas inlet line 56 which would be a typical natural gas or the like, which would enter an ignition zone 58, wherein a firing plug 60 would be inserted within ignition zone 58 to ignite natural gas 50 and mix the ignited natural gas 56 with the flow of air from fan 44 so that a super-heated flow of air is injected into the heating means 40 of the apparatus.

As seen in the FIGS., the heating means 40 of the apparatus 15 is clearly illustrated in top view in FIG. 2. This heating means would include a pair of parallel hot air flow channels 60 and 62 which would be in parallel spaced apart relation and directed within chamber 15 in a modified "S" fashion as seen in FIG. 2, so that there are a plurality, namely eight alternating left and right angle turns that the heating chambers would go through in order to reach an exit point 64 at the front end 12 of the chamber 15. More particularly, each channel 60 and 62 would enter chamber 15 to make a first left turn 66 follow along a path substantially toward wall 14 to make a right turn 68 traveling approximately ⅓ of the distance of chamber 15 to make a second right turn 70 following back towards the wall 18 of the chamber to make a second left turn 72 following approximately an additional ⅓ of the chamber to make a third left turn 74 again following back towards wall 14 to make a seventh right turn 76 again, the final ⅓ of the chamber to make a forth right turn 78 and returning forward wall 18 to make a forth left turn 80 and then following out of wall 12 to exit at point 64. This plurality of right and left angle turns to make the modified "S" pattern as seen in the FIGURE, would allow that any grease 42 contained within the chamber as seen in FIG. 5, would be at all times in reasonable proximity from either the wall portion of channel 60 or 62, and would therefore radiate heat more efficiently into the oil within chamber 15 as seen in the FIGURE In fact, at no point is any grease contained within that portion of the chamber less than approximately 1" from the wall of either heating channel 60 or 62 while heating is taking place. This is found to be a very efficient manner of heating the grease in the chamber.

It has been found also in this particular modified "S" configuration of the hot air flow tubes 60 and 62 within the system, that at every right angle turn in the system, there is created a type of whirlpool effect of the super-heated air as it travels through the system to the exit point 64. This whirlpool effect creates more retention time of hot air within flow channel 60 and 62, which would therefore provide for greater heat transfer of the interior 73 of channels 60 and 62 to the surrounding oil in the system, therefore providing more heat loss into the oil and less heat exiting out of the channels as reported in the test data.

Figure 6:
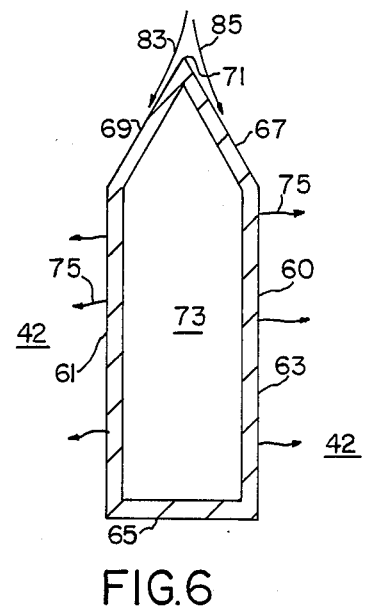
FIG. 6 is a cross sectional view of one of the hot air flow channels in the preferred embodiment of the apparatus of the present invention.

Turning now to FIG. 6, there is illustrated in detailed cross sectional view a section of channel, for example channel 60, which would comprise a pair of vertical side walls 61 and 63; a floor portion 65; and a pair of top walls 67 and 69 meeting at a central point 71. The walls as previously stated would define a continuous heated air passageway 73 through the interior each channel 60 and 62 for the heated air that would enter each channel at point 61 of chamber 15. The heated air would therefore radiate outward in the direction of Arrows 75 as seen in FIG. 6 into the surrounding oil 42 to transfer heat into oil 42 during the heating process. As seen further in the FIGURE, for the most part, channels 60 and 62 are contained in the lower ⅓ portion of heating chamber 15 so that grease or the like is heated from the bottom up. There is a cooking zone 80 in the top portion of the chamber for allowing food stuffs contained in baskets or the like to be cooked therein. In addition, in returning to the structure of each heating element 60 and 62, the apex 71 would provide a means for preventing food stuffs which would fall from, cooking zone 80 down into the heating element zone, not rest on the heating element but to continue downward into a "cold zone" 77 as seen by Arrows 83 and 85. Therefore, while cooking is going on, no food stuffs would be collected on the heating elements 60 and 62 which may cause burning or the like of the food and discoloration and distastefully taste to the food stuffs due to the burned items contained in the grease.

Figure 7:
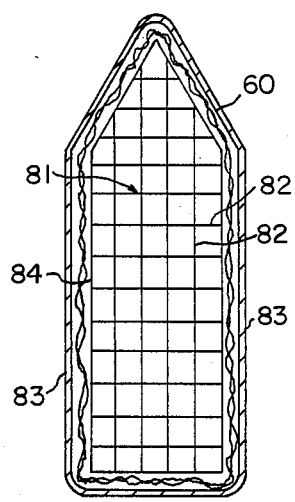
FIG. 7 is a cross-sectional view of a hot air flow channel modified with honey comb ceramic combustors and expandable felt gasket.

FIG. 7 illustrates a cross-sectional view of a hot air flow channel 60 which is a standard flow channel as illustrated in FIGS. 6, that has been modified for more efficient heat production within the flow channel. The modification of the flow channel is illustrated as housing an internal honeycomb ceramic combustor element 81 comprising a plurality of vertical and horizontal extending members 82 to configure the honey comb combustion element 81. There is further included an expandable felt gasket 83 secured between the outermost face 84 of the honeycomb element 81 and the internal face of the channel walls of channel 60. The type of honeycomb combustion element that is foreseen in use is the type that is the subject of U.S. Pat. No. 4,350,613, which may combine the precious metal, platinum, and pladium in the most effective manner to ensure that it will burn cleanly for many years. As the hot air would channel through the honeycomb ceramic combustor element 81, the expandable felt gasket material 83 would expand to close off any space between the wall of outer channel 60 and the face 84 of combustor element 81, to ensure that all hot air flowing in channel 60 is flowing through the combustor means 81. For purposes of use, it is foreseen that the combustor honey comb means would be inserted into the channel 60 at various spots along its length, so that the heating oil which is being heated by the hot air in channel 60, is heated more efficiently, with less out put of energy required. It may well be that in practicing the invention the greater portion of channel 60 would contain the honey comb ceramic combustor 81 rather than only in selected portions of the channel.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A deep fat gas fryer apparatus, comprising:
   a. an open chamber for containing cooking oil therein, the chamber having first, second, third and fourth walls and a floor, the first wall being opposite the second wall;
   b. a pair of substantially parallel coplanar, horizontally disposed, hot air flow channels positioned within the cooking oil and extending through the chamber from the first wall of the chamber to the second wall of the chamber in a series of left and right angulated turns for configuring a modified -"s" pattern, the air flow channels being spaced from the floor, and
   c. means for injecting a heated flow of air into the pair of hot air flow channels so that heated air flows through the pair of flow channels from the first wall to the second wall of the chamber.

2. The apparatus in claim 1, further including a gas combustion means for heating the air being injected into the hot air flow channel.

3. The apparatus in claim 1, wherein each hot air flow channel further provides an apex on its upper portion so that food stuffs cannot be retained on the surface of the hot air flow channel.

4. A deep fat gas frying apparatus, comprising:
   a. a substantially open ended chamber for containing oil, the chamber having first, second, third, and fourth walls and a floor, the first wall being opposite the second wall; and
   b. oil heating means contained within the chamber comprising a pair of parallel coplanar, horizontally disposed hot air flow channels in a modified "S" configuration, extending from the first wall of the chamber to the second wall of the chamber, the air flow channels being submerged in the oil and receiving hot air injected through the flow channels to heat the oil surrounding the flow channels.

5. The apparatus in claim 4, wherein there is further provided a means for heating the air that is injected into the hot air flow channels.

6. The apparatus in claim 4, wherein the hot air flow channels further comprise means to prevent food stuffs from making permanent surface contact with the flow channels during the heating process.

* * * * *